July 12, 1960 A. C. KEATHLEY ET AL 2,944,390
TERMINATION OF THRUST IN SOLID-PROPELLANT ROCKETS
Filed March 25, 1957 3 Sheets-Sheet 1

INVENTORS
A.C. KEATHLEY
N.A. KIMMEL
BY Hudson and Young
ATTORNEYS

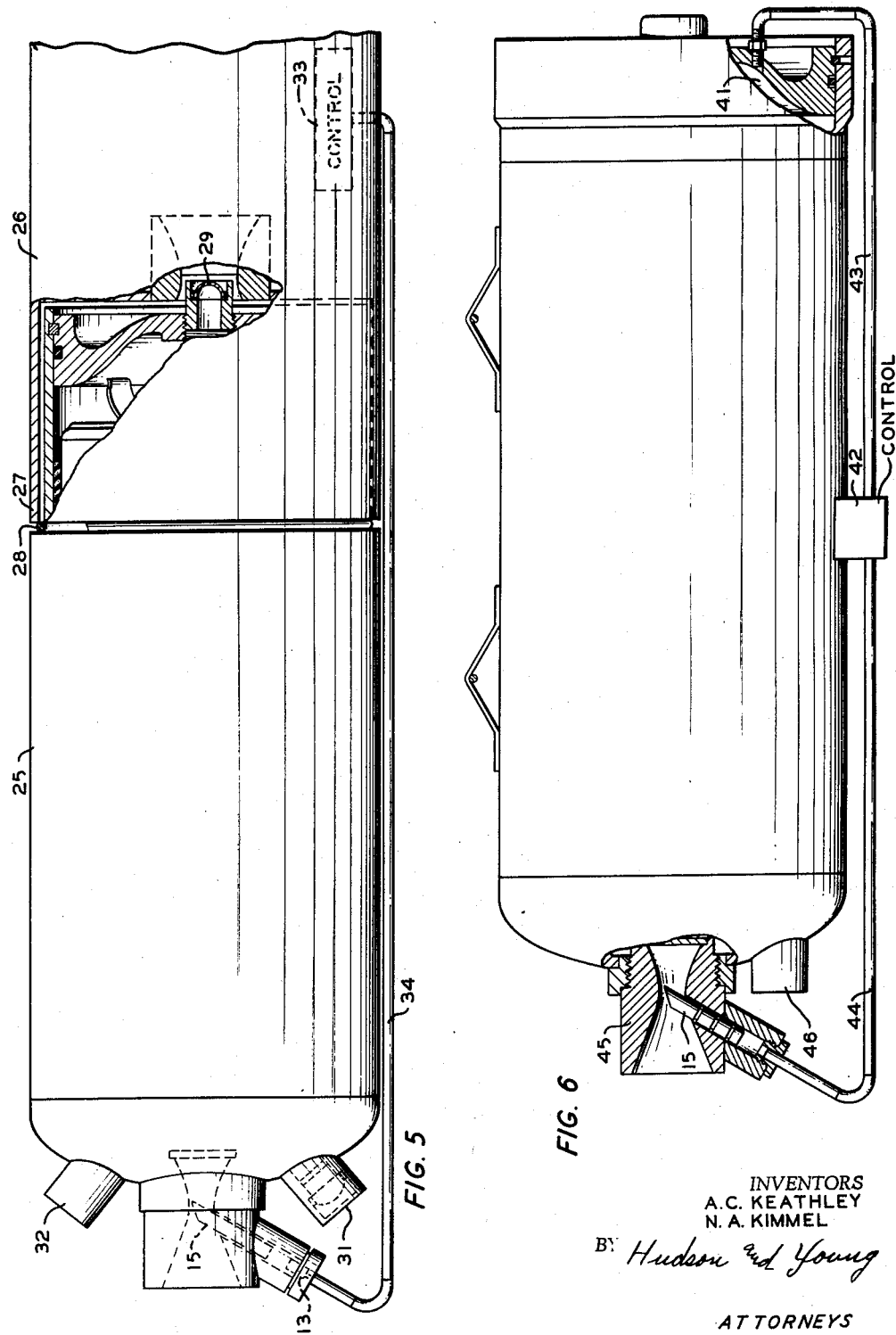

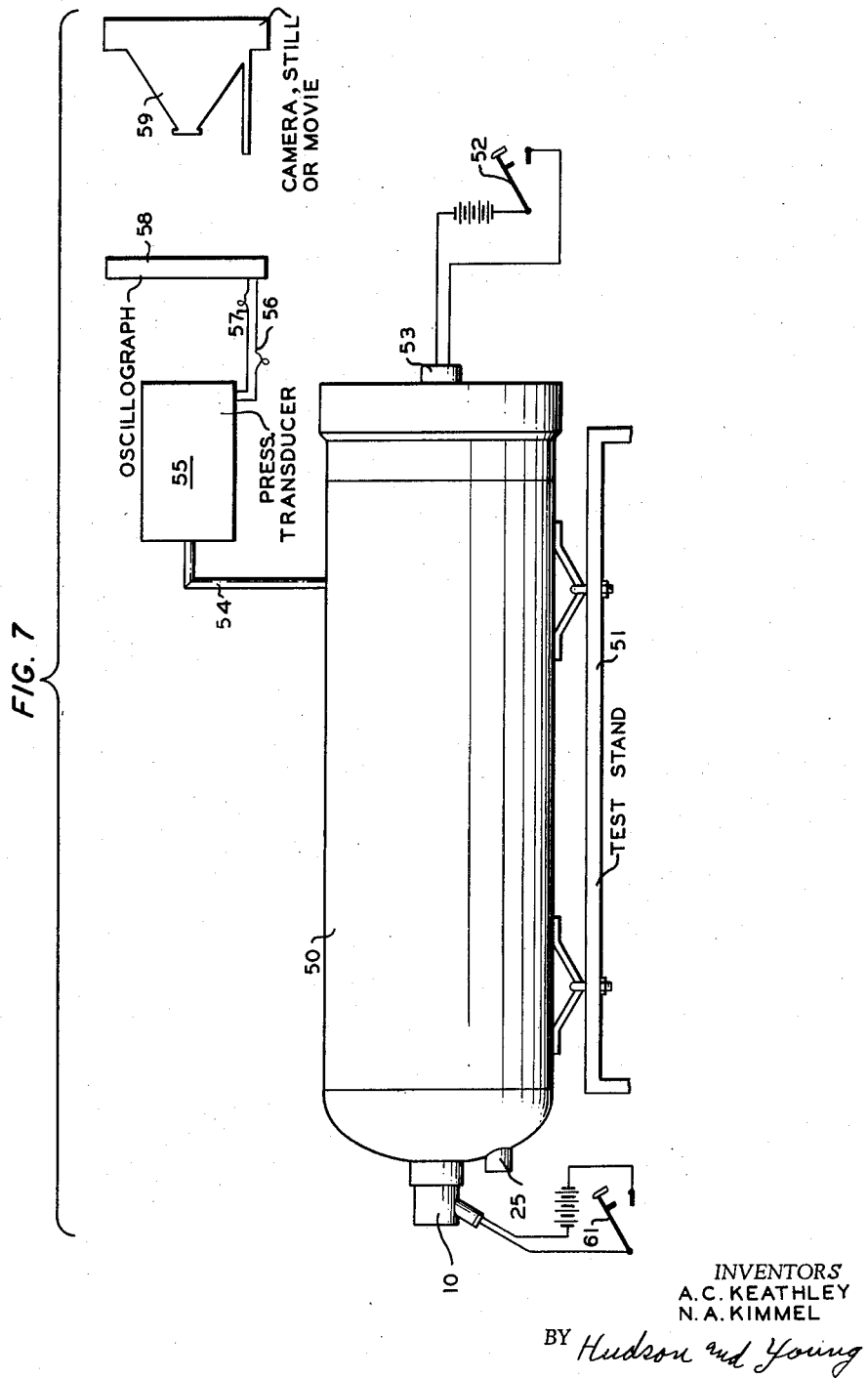

United States Patent Office 2,944,390
Patented July 12, 1960

2,944,390

TERMINATION OF THRUST IN SOLID-PROPELLANT ROCKETS

Anthony C. Keathley and Norman A. Kimmel, Waco, Tex., assignors to Phillips Petroleum Company, a corporation of Delaware Filed Mar. 25, 1957, Ser. No. 648,439

8 Claims. (Cl. 60—35.6)

This invention relates to solid-propellant rockets. In one aspect it relates to a method and means for terminating thrust in a solid-propellant rocket. In another aspect it relates to a method and means for determining the bursting pressure of the safety discs in a rocket motor and the bursting pressure of the rocket motor case at any instant during firing period.

In the utilization of rockets it is desirable to be able to terminate the thrust of the rocket motor at will. This is fairly simply attained in liquid-propellant rockets by termination of injection of fuel to the combustion chamber. For this reason liquid fuel rockets have found application in many diversified fields such as use in guided missiles where controlled thrust termination facilitates guiding the missile along a desired trajectory, and in rockets designed to accelerate the speed of aircraft where a short burst of additional power is required. Application of solid-propellant rockets to these uses presents a problem in terminating combustion of the solid propellant. Another problem which exists in utilization of solid-propellant rockets is that of testing the bursting strength of safety discs used in such rockets and in testing the bursting strength of the rocket motor case itself under actual conditions encountered in firing the rocket.

It is, therefore, an object of this invention to provide an instantaneous termination of thrust in a solid-propellant rocket motor. It is another object of this invention to provide a means for testing the bursting strength of a rocket motor case and its component parts. It is still another object of this invention to provide a means for simultaneously disengaging a booster stage rocket from the remaining rocket, and terminating thrust of the booster stage rocket. It is still another object of this invention to cause cessation of combustion of a solid-propellant rocket grain during the firing period. Other and further objects and advantages of this invention will be apparent to one skilled in the art upon study of the disclosure of this invention including the drawing wherein:

Figure 5 is a partial sectional view of a booster stage rocket having incorporated therein the thrust termination means of this invention;

Figure 6 illustrates a modification of the thrust termination device of this invention as applied to a conventional rocket motor; and Figure 7 represents a rocket motor testing assembly having an exhaust nozzle constructed according to this invention.

Figure 1:
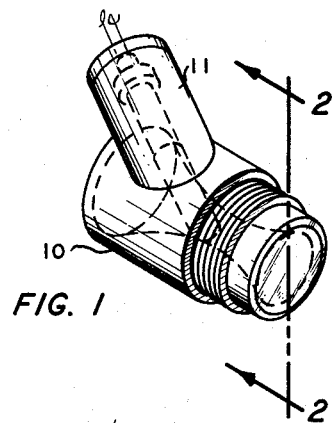
Figure 1 represents an isometric view of one embodiment of a rocket motor nozzle according to this invention.

Broadly, the invention contemplates a means for terminating the thrust of a solid-propellant rocket motor which comprises forcing a pintle or piston into the rocket motor exhaust nozzle throat so as to increase the pressure within the rocket motor case sufficiently to burst a frangible disc incorporated in the rocket motor case thereby reducing the pressure within the rocket motor case to a pressure below that required to sustain combustion of the solid-propellant grain thereby causing cessation of combustion. In this manner it is possible to test the bursting pressure of the safety disc of a rocket motor under actual firing conditions. It is also possible to test the bursting pressure of the rocket motor case by replacing the safety disc with a pressure-resistant plug. Thrust termination of a rocket can be accomplished at will by utilizing the exhaust nozzle of this invention to rupture one or more frangible discs thereby reducing the pressure in the rocket motor case sufficiently to cause cessation of combustion of the rocket grain. Thus, the thrust of a rocket motor utilized to propel a guided missile or as the booster stage of a multi-stage rocket can be terminated at will by utilizing the exhaust nozzle of this invention.

The slow-burning solid propellants in use at the present time are pressure sensitive so that the burning rate is proportional to the pressure and a pressure of several hundred pounds is necessary to maintain a burning rate sufficient for continuous combustion. A preferred type of solid propellant comprises 50–90 weight percent ammonium nitrate, 10–50 weight percent of a rubbery copolymer of a conjugated diene and a polymerizable heterocyclic nitrogen compound, a burning rate catalyst such as Milori blue, and appropriate curing agents. Such propellant composition requires a pressure of about 200 p.s.i. to maintain combustion and the combustion rate increases with increasing pressure.

Solid-propellant rocket motors are designed to operate at a given pressure, for example, a JATO (jet assisted take-off) rocket motor is often designed to operate at about 1000 p.s.i. If, as a result of undue rough handling or for other cause, the propellant grain in a rocket motor becomes broken, the burning surface of the propellant grain may be thereby greatly increased and upon being fired the resulting pressure within the rocket motor case may become greatly in excess of that of the bursting pressure of the motor case. In order to prevent an explosion in such instance, a safety disc or frangible diaphragm is incorporated into the rocket motor case and is designed to burst at a pressure well below the safety limits of the rocket motor case. The area of the safety disc can be such that upon being ruptured the pressure within the rocket motor case is reduced sufficiently so that the pressure within the rocket motor case is not sufficient to maintain combustion. The safety disc area required to terminate thrust for any combination of solid propellant and exhaust nozzle area can be determined by conventional methods and calculations. When an ammonium nitrate/rubbery copolymer propellant is utilized the area of the safety disc should be great enough to reduce the pressure in the rocket case to less than 200 p.s.i. in order to terminate combustion.

A better understanding of the invention may be had by references to the drawing wherein Figure 1 represents a rocket motor exhaust nozzle 10 having a cylinder 11 secured thereto. The relationship of the cylinder 11 to exhaust nozzle 10 is more clearly defined in Figure 2. Cylinder 11 has a bore 12 and a closed end 14 with an explosive charge 13 positioned in the end closure member 14. A pintle or piston 15 is positioned in bore 12 of cylinder 11 and a snug fit is provided by O-rings 16 positioned in grooves 17 around pintle 15. The bore 12 continues through nozzle 11 so that the pintle 15 has access to the throat 18 of nozzle 10. The explosive charge 13 is detonated by an electrical pulse through wires 19 and 20. Pressure disc 21 enables the solid propellant, upon being ignited, to attain sufficient pressure within the rocket motor case to maintain combustion and is ruptured almost immediately upon ignition of the propellant grain.

Figure 2:
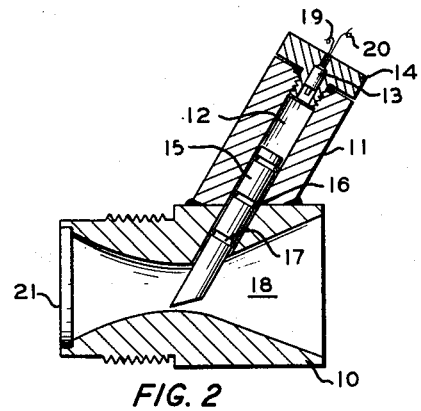
Figure 2 is a sectional view of Figure 1 along lines 2—2.
Figure 3:
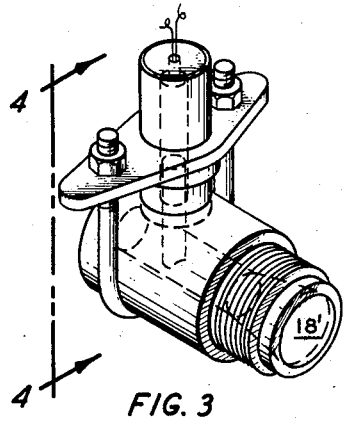
Figure 3 is an isometric view of a modification of the rocket motor nozzle shown in Figure 1.
Figure 4:
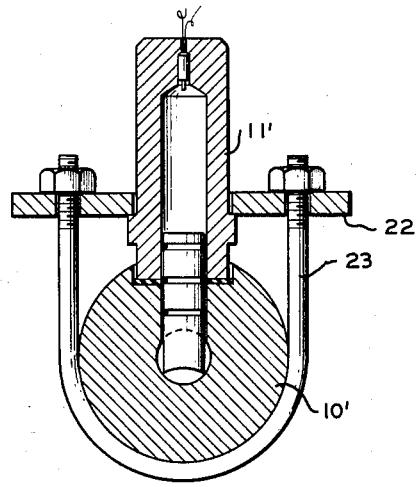
Figure 4 is a sectional view taken along lines 4—4 of Figure 3.

Figures 3 and 4 illustrate a modification of the embodiment of Figures 1 and 2 wherein the nozzle throat 18' is not a conventional Venturi shaped nozzle but is a straight orifice and is used primarily for testing the bursting strength of the rocket motor case. The cylinder 11' is positioned upon the nozzle 10' normal to the nozzle throat 18' and is secured by a flange member 22 and a U-bolt 23.

Figure 5 illustrates a modification of the invention adapted to disengage the exhausted stage of a multi-stage rocket and to simultaneously terminate the thrust of the exhausted stage. The first stage, represented by 25 is connected to the second stage 26 by means of the guide tube 27. Bumper ring 28 provides a sealing means between the two stages. Frangible disc 29 is positioned in the forward end plate of the first stage rocket motor and upon being ruptured serves to sever the two stages. Frangible discs 31 and 32 provide an equalizing thrust upon being ruptured and upon disengagement of the first and second stages. The frangible discs 29, 31 and 32 are arranged substantially symmetrically so that the thrust in any one direction is substantially zero. The total area of the three frangible discs is such that the pressure in the rocket motor case is rapidly reduced to a value which will not support combustion of the solid propellant. The pintle 15 is actuated by control mechanism 33 through appropriate means connecting the control mechanism 33 and the explosive charge 13 through conduit 34. The control mechanism 33 can be a timing mechanism which actuates the closing of contacts in an electrical circuit adapted to ignite the explosive charge 13. Frangible disc is designed to rupture at a pressure slightly less than that required to rupture frangible discs 31 and 32. When disc 29 ruptures the gases are momentarily confined in effecting separation of the two rocket stages so that the pressure in the rocket case increases sufficiently to rupture discs 31 and 32. The combined areas of the frangible discs are sufficient to relieve the pressure in the rocket motor case and terminate combustion of the propellant.

Figure 6 illustrates a modification of the invention wherein the gas pressure generated in the rocket motor case is utilized to force the closure pintle into the nozzle throat. In this modification the pressure of the gases within the rocket motor case 41 is exerted upon the control mechanism 42 by means of conduit 43. Control mechanism 42 can be a time actuated valve which, upon the expiration of a given time, opens to allow pressure of the gases within the rocket motor case 41 to be exerted upon the pintle 15 through conduit 44. The pressure of the combustion gases forces the pintle into the throat of the nozzle 45 thereby increasing the pressure within the rocket motor case 41 sufficiently to rupture the frangible disc 46 thereby relieving the pressure within the rocket motor case 41 and terminating combustion of the solid propellant.

In the embodiment of the invention shown in Figure 7 the nozzle 10 of Figure 1 is installed in a JATO motor 50 which is secured to test stand 51. Firing of the solid propellant charge in the motor case is obtained by closing switch 52 so as to actuate the igniter indicated at 53. The pressure generated in motor case 50 is transmitted by means of pressure take-off conduit 54 to pressure transducer 55 where pressure is converted into an electrical signal. The signal produced in transducer 55, after suitable amplification, is telemetered by electrical conductors 56 and 57 to oscillograph 58. The signal appears on the oscillograph as a moving dot of light which is photographed by camera 59 which can be a moving picture camera or other suitable photographic means. A "strip camera" is a preferred means comprising a camera operated with an open shutter wherein a strip of film is moved through the camera and the moving dot of light is recorded as a line.

The pintle of nozzle 10 is driven into the nozzle throat by closing switch 61 so as to detonate the squib in the cylinder of nozzle 10, see Figure 2 for detail of nozzle 10. The increased pressure in motor 50, resulting from the impediment in the nozzle throat, causes diaphragm 25 to rupture. The opening, resulting from rupturing the frangible safety diaphragm 25, is larger than the original nozzle opening and the pressure in motor 50 is rapidly decreased so that combustion of the propellant grain ceases.

A specific embodiment of the invention will now be described with respect to Figure 7 of the drawing. A rocket motor 50, of the JATO type is secured to test stand 51. The motor is charged with an external-internal burning solid propellant grain comprising about 16 parts by weight of a copolymer of butadiene and methyl vinylpyridine, about 83 parts by weight of ammonium nitrate, and about 2 parts by weight of milori blue per 100 parts of total propellant. The propellant grain is designed to have a firing period of about 16 seconds.

The safety diaphragm 25 is designed to burst at about 1900 p.s.i. and the motor and propellant grain are designed to operate at a maximum working pressure of about 1500 p.s.i. at 170° F. conditioning temperature.

The conventional exhaust nozzle of the motor is replaced with the nozzle illustrated in Figures 1 and 2 of the drawing. The rocket is fired by closing switch 52 so as to actuate igniter 53 which is a conventional igniter. After the pressure has built up to the maximum, but before the charge is exhausted the switch 61 is closed detonating the squib and thus forcing the pintle into the throat of the nozzle 10, thereby substantially closing the nozzle throat. The pressure rapidly builds up in the motor case until the safety disc or diaphragm is ruptured. The area of the safety disc is larger than that of the exhaust nozzle, therefore the pressure within the motor case is reduced. In some of the safety disc bursting pressure tests conducted on JATO motors the combustion of the propellant was terminated by the reduction of pressure.

The pressure generated within the motor case is transmitted by pressure conduit 54 to transducer 55 where the pressure value is converted into an electrical signal and is telemetered to oscillograph 58. The signal appears upon the calibrated face of the oscillograph as a moving dot of light. The path of the dot of light is recorded upon film by the camera 59. Thus the pressure at which the safety disc is ruptured is recorded upon the film.

The bursting strength of the motor case is determined by a similar procedure wherein the safety disc is replaced by a pressure resistant plug.

Reasonable variations and modifications are possible within the scope of the disclosure of the present invention, the essence of which is a device wherein a pintle is forced into the nozzle throat of a solid propellant rocket motor so as to burst a frangible diaphragm in the rocket motor case.

That which is claimed is:

1. Apparatus for terminating thrust of a solid-propellant rocket motor having a combustion chamber, an exhaust nozzle of suitable area to maintain suitable operating pressure within the motor case, and a safety disc having an area sufficiently greater than that of said nozzle so as to reduce the pressure in the motor case to a pressure insufficient to maintain combustion, positioned in the combustion chamber wall of said motor, which comprise a first means communicating with said nozzle and adapted to be forced radially into said nozzle so as to substantially close said nozzle so as to increase the pressure in the combustion chamber and burst the safety disc; and a second means operatively connected to said first means to force the first said means radially into said nozzle.

2. Apparatus according to claim 1 wherein said first means comprises a cylinder positioned adjacent the throat of said exhaust nozzle with an open end communicating with said throat and having the other end closed; and a piston positioned in said cylinder with one end adjacent the nozzle throat and the other end adjacent the closed end of the cylinder.

3. Apparatus according to claim 1 wherein said first means comprises a cylinder positioned adjacent the throat of said exhaust nozzle with an open end communicating with said throat and having the other end closed; and a piston positioned in said cylinder with one end adjacent the nozzle throat and the other end adjacent the closed end of the cylinder and wherein said second means comprises an explosive charge positioned in the closed end of the cylinder adjacent said piston of said first means; an electric network connected to said charge so as to detonate same; and a switch in said network.

4. Apparatus according to claim 3 wherein pressure sensing and recording means are operatively connected to the interior of the combustion chamber.

5. For use in testing the bursting pressure of a rocket motor case having a combustion chamber, apparatus comprising a nozzle adapted for communication with the combustion chamber of said rocket motor; a cylinder adjacent and communicating with the opening of said nozzle; a piston in said cylinder having a diameter substantially equal to that of said nozzle; sealing means providing a gas-tight seal between said cylinder and said piston; an explosive charge positioned in the closed end of said cylinder and in communication with the cylinder; means for detonating said explosive charge so as to drive said piston into said nozzle opening; and pressure sensing and recording means operatively connected to the interior of the combustion chamber.

6. For use in testing the bursting pressure of a rocket motor case having a combustion chamber therein, apparatus comprising a nozzle adapted for flow of combustion gases longitudinally therethrough; means for operatively connecting said nozzle to the combustion chamber of the rocket motor; a cylinder having one open end and one closed end positioned adjacent said nozzle with the open end in communication with the flow of gases through said nozzle; an explosive charge in the closed end of said cylinder in communication with said cylinder; a piston in said cylinder; means for detonating said explosive charge so as to drive said piston into said nozzle and substantially stop the flow of gases therethrough; and pressure sensing and recording means operatively connected to the interior of the combustion chamber.

7. In a multistage rocket comprising a booster stage rocket having a combustion chamber and an exhaust nozzle and at least one secondary stage, means for disengaging said booster stage and terminating thrust thereof comprising severable means connecting the booster stage to the second stage; a frangible disc positioned in the leading wall of the combustion chamber of the booster stage rocket adjacent the second stage rocket; a plurality of frangible discs postioned in the trailing end of the combustion chamber of the booster stage rocket; a first means communicating with said exhaust nozzle and adapted to be forced radially into said nozzle so as to substantially close said nozzle; a second means for forcing the first means into said nozzle; and control means for actuating said second means.

8. For use in testing the bursting pressure of a frangible safety disc of a rocket motor case having a combustion chamber therein and a frangible safety disc positioned in the wall of said combustion chamber, apparatus comprising a nozzle adapted for flow of combustion gases longitudinally therethrough; means operatively connecting said nozzle to the combustion chamber of the rocket motor; a cylinder having one open end and one closed end positioned adjacent said nozzle with the open end in communication with the flow of gases through said nozzle; an explosive charge in the closed end of said cylinder in communication with said cylinder; a piston in said cylinder; means for detonating said explosive charge so as to drive said piston into said nozzle and substantially stop the flow of gases therethrough; and pressure sensing and recording means operatively connected to the interior of the combustion chamber.

References Cited in the file of this patent

UNITED STATES PATENTS

| | | |
|---|---|---|
| 2,426,526 | Rutishauser et al. | Aug. 26, 1947 |
| 2,478,958 | Wheeler et al. | Aug. 16, 1949 |
| 2,493,725 | McMorris | Jan. 3, 1950 |
| 2,578,443 | Nardone | Dec. 11, 1951 |

FOREIGN PATENTS

| | | |
|---|---|---|
| 659,758 | Great Britain | Oct. 24, 1951 |